July 15, 1930.    A. C. JELLISON    1,770,523
NUT LOCK
Filed Nov. 10, 1928

INVENTOR:
ALLEN C. JELLISON.
BY
ATTORNEY.

Patented July 15, 1930

1,770,523

UNITED STATES PATENT OFFICE

ALLEN C. JELLISON, OF FORT WORTH, TEXAS

NUT LOCK

Application filed November 10, 1928. Serial No. 318,497.

The general object of this invention is to provide an improved means for locking a nut against turning on its bolt. I am aware that various means have been suggested for accomplishing this purpose, but it would seem that no satisfactory solution of the problem has been made, for the reason that no such device is in general use.

I aim to provide a nut lock which shall be simple in construction and efficient in operation, which will be relatively inexpensive to manufacture, and which, I believe, may be used with advantage in all cases where the prevention of the loosening of nuts is a desideratum.

While not limited in application, the invention will probably find its widest field of employment in fastening the plates of fish joints of the rails of railroads. In the automobile industry also, I contemplate that my nut lock will be found exceedingly useful.

In its broad aspect, the invention consists in providing the nut with a series of grooves, preferably radially arranged on one of its ends or faces, in forming a longitudinal groove in the threaded portion of the bolt, and in providing a pliable locking tongue or plate which is insertable in the groove of the bolt and at its inner end is adapted to engage in an interdental recess formed at the bottom of the groove near the inner end of the latter, so that when the nut is screwed home on the bolt, the locking tongue can be readily bent out of the groove, whereupon it is twisted and inserted edgewise in one or the other of the grooves of the nut. If it should project beyond the side of the nut, its end can, of course, be bent to lie against the nut.

In the accompanying drawing:—

Figure 1:
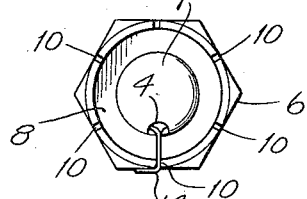
Figure 1 is a view in end elevation showing a nut applied to a bolt and locked thereon against rotation according to the means constituting my invention.

Referring now to the drawing, the numeral 1 indicates a bolt having a head 2 and a screw-threaded portion 3, these parts being of the usual construction. In order to adapt the bolt to co-operate with my invention, I provide in one side of the threaded portion thereof a longitudinal groove 4, shown in Figs. 2 and 6, and near the bottom of said groove I provide an interdental recess 5. The numeral 6 indicates a nut screwthreaded on its interior, as indicated at 7 in Fig. 7, and provided in its outer end portion with a recess. In the construction of nut as shown in Fig. 7, this recess, indicated by the numeral 8, is cylindrical, while in the construction shown in Fig. 10, the recess indicated by the numeral 9 is conical. Each form has advantages in certain applications. In either form, the wall of the recess is provided with slots 10 cut from the outer face of the bolt to near the bottom of the recess 8, or 9.

Figure 2:
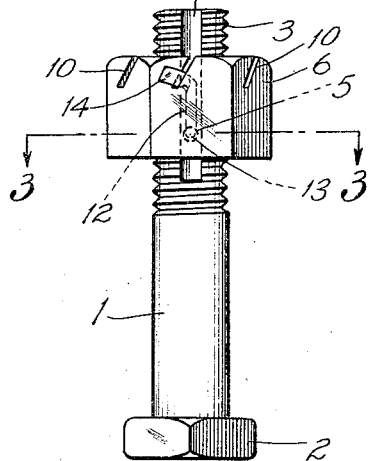
Figure 2 is a view in side elevation showing a nut applied to a bolt and locked thereon against rotation according to the means constituting my invention.
Figure 3:
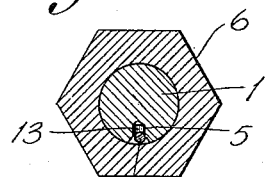
Figure 3 is a sectional plan view on the line 3—3 of Fig. 2.
Figure 10:
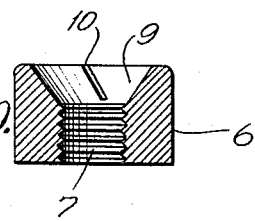
Figure 10 is a cross-sectional view illustrating a different construction of nut from that shown in Fig. 7.

In Fig. 1, I have shown the nut 6 to be hexagonal, and preferably six of the slots 10 would be provided, one for each face of the nut. As shown in Figs. 2, 7 and 10, the slots 10 are inclined to the vertical for a purpose to be presently described.

Figure 4:
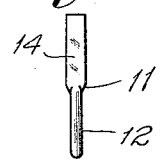
Figure 4 is a face view of a locking plate used with my invention.
Figure 5:
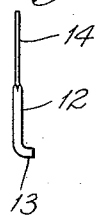
Figure 5 is an edge view of the same.

Referring to Figs. 4 and 5, the numeral 11 indicates a pliable metal tongue which has a rounded portion 12, the lower end of which is bent outwardly at right angles, as indicated at 13, and a flat portion 14. This tongue is the element used in locking the nut against rotation and the manner of assembling the parts to this end will now be described.

Figure 6:
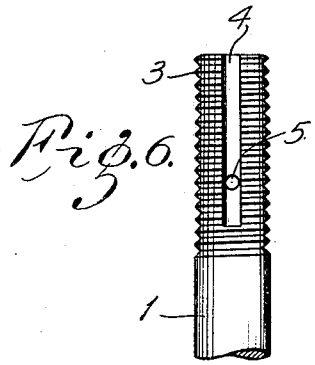
Figure 6 is a view in elevation of the screw-threaded portion of a bolt slotted and recessed in accordance with my invention.
Figure 7:
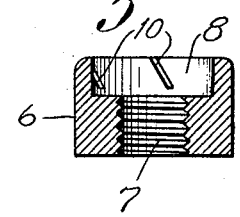
Figure 7 is a cross-sectional view of a nut constructed to form a co-operating element of my invention.

Referring to Fig. 6, and to the dotted lines in Fig. 2, when it is desired to screw the nut on the bolt, the locking plate 11 is placed in the groove 4 with its projection 13 engaging in the recess 5. The locking plate fits snugly in the recess and normally occupies a position below the outer surface of the threads so that the nut 6, when screwed on the bolt, will pass over said locking plate. When this operation has occurred, more or less of the flat portion 14 of the locking plate will project beyond the outer face of the nut. This portion is next bent outwardly by a suitable implement and given a half turn and inserted edgewise in one or the other of the slots 10.

It will now be seen that the nut, when secured by the locking plate as above described, cannot turn on the bolt as the engagement of the lug or hook 13 in the recess 5 will prevent the necessary outward movement of the nut and, moreover, the engagement of the body of the locking plate with the walls of the groove 4 will prevent the nut from being turned. The grooves 10 are inclined to the vertical to make the removal of the flat or end portion of the locking tongue exceedingly difficult, if not practically impossible. This arrangement of the grooves, however, is only valuable in degree over vertical grooves, because the latter would operate very effectively to prevent removal of the tongue.

It will be understood, of course, that the turning of the nut which my nut lock is intended to prevent would be such turning as would be caused by vibration, and the locking plate, therefore, does not have to be very strong to prevent turning of the nut caused in such way. It therefore follows that the locking plate can be readily removed from its groove and forced down in the slot 4 and the nut removed in the usual manner when so desired. My improved nut lock, therefore, can be used in place of the ordinary construction of nut and bolt employing a cotter pin, such as is almost universally used in automobile construction. It will be found very much easier to apply because the relatively large number of slots 10 which can be employed makes it very easy to bring one of the slots in position to receive the locking plate.

Figure 8:
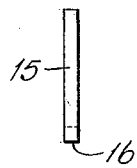
Figure 8 is a face view of a modified form of locking plate.
Figure 9:
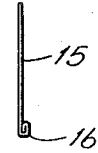
Figure 9 is an edge view of the same.

In Figs. 8 and 9, I have shown another form of locking plate which consists of a flat strip of metal 15 having one end rolled or bent upon itself, as indicated at 16, to provide a lug or projection corresponding to the projection 13 in the form of locking plate shown in Fig. 5. This modified construction of locking plate is used in the same way as described with reference to the first form.

In Fig. 10, I have shown, as stated, a conical recess in the end of the nut 6, but this involves more a manufacturing than a structural change as, in either case, the locking plate is applied in the manner heretofore described. It may be stated, however, that the cylindrical recess shown in Fig. 7 affords slightly more room to manipulate the locking plate in twisting and bending it, and where a strong locking plate is employed, that is, one quite hard to bend and twist, the construction shown in Fig. 7 would probably be found more desirable.

I claim:

In combination with a bolt having a longitudinal groove in its threaded portion and an interdental recess located toward the inner end of said groove, a nut screwed on said bolt and having in its outer face, a recess surrounding the screwthreaded aperture therein, the wall whereof is provided with a series of radiating slots inclined to the vertical axis of the nut, and a pliable locking plate mounted in said groove and having at one end an integral projection engaging in said recess and having a flat outer end projecting beyond the outer face of said nut when screwed home, the flat portion of said locking plate being bent outward from said groove, given a part turn, and inserted edgewise in one or the other of said recesses.

In testimony whereof, I have hereunto set my hand.

ALLEN C. JELLISON.